March 3, 1936.     C. F. RAUEN ET AL     2,032,592
AUTOMATIC TRANSMISSION
Filed Nov. 4, 1933     3 Sheets-Sheet 2
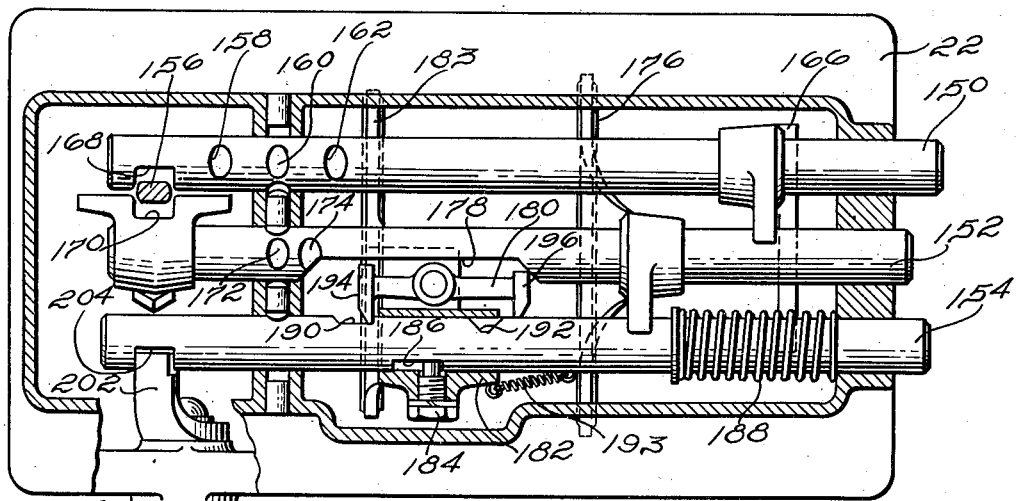
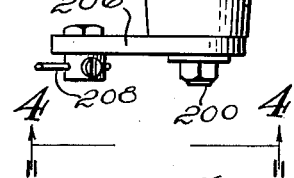
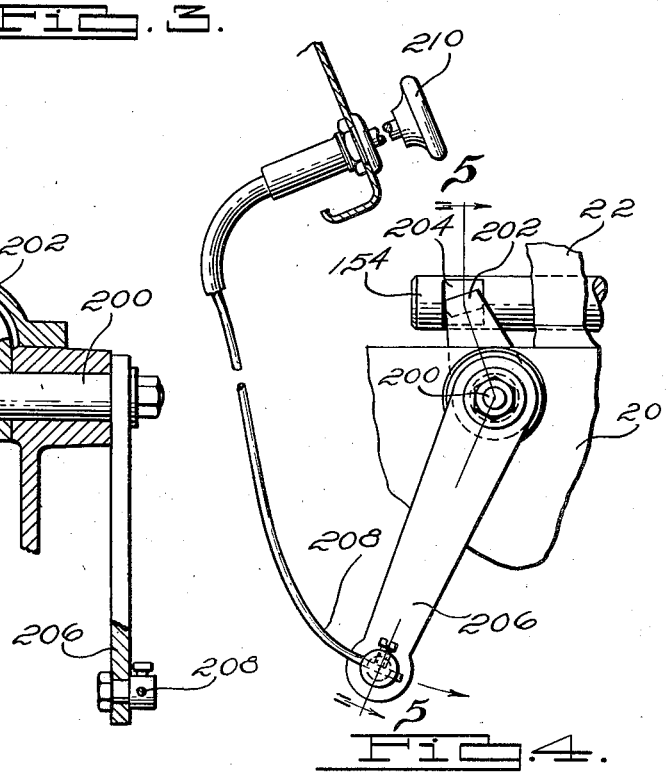
INVENTORS
Carl F. Rauen,
Ano E. Kilpela.
BY
ATTORNEY.

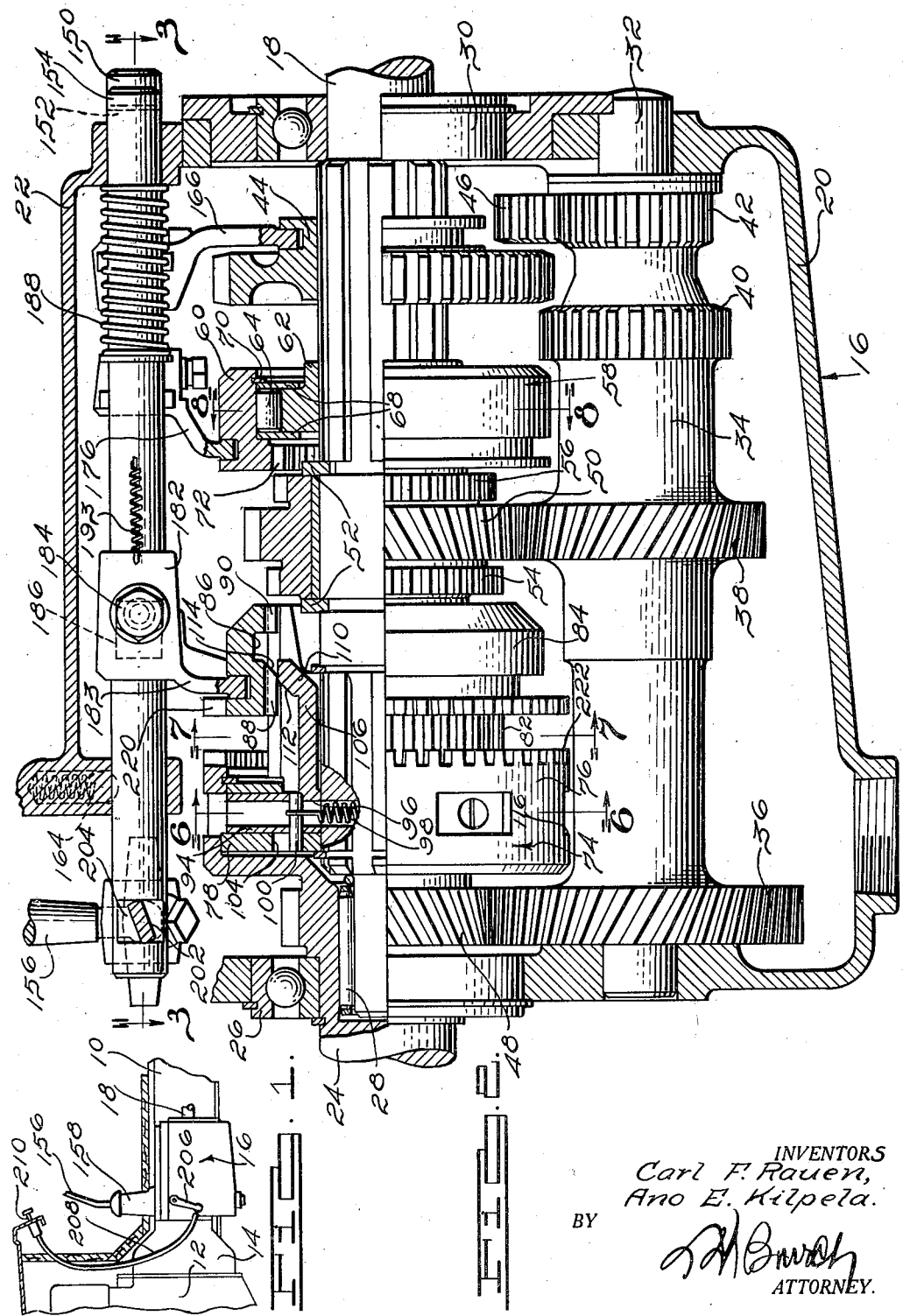

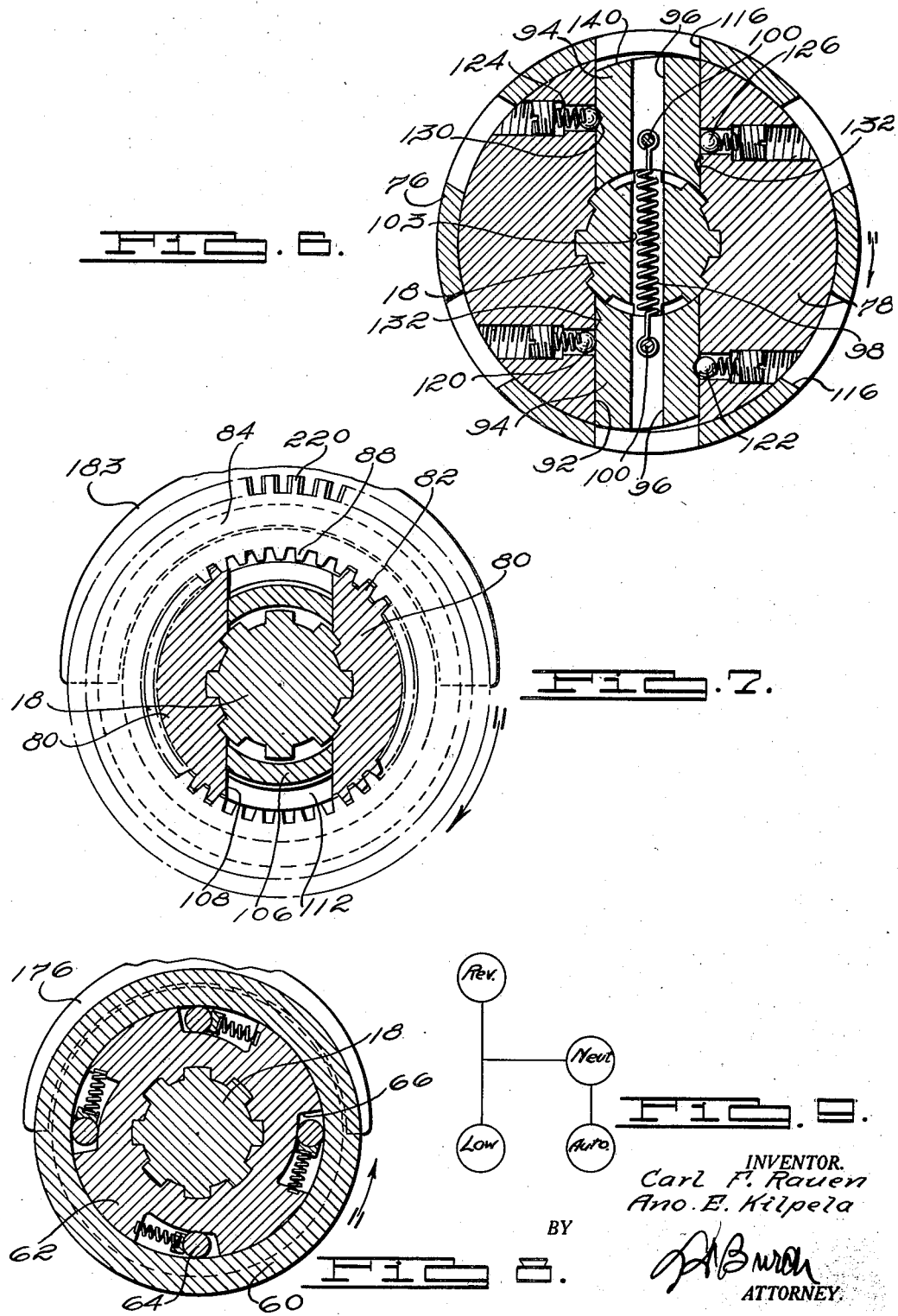

Patented Mar. 3, 1936

2,032,592

UNITED STATES PATENT OFFICE 2,032,592

AUTOMATIC TRANSMISSION

Carl F. Rauen, Grosse Pointe, and Ano E. Kilpela, Detroit, Mich., assignors, by mesne assignments, to Borg-Warner Corporation, a corporation of Illinois Application November 4, 1933, Serial No. 696,690

17 Claims. (Cl. 74—336)

This invention, in general, relates to improvements in transmissions or power transmitting mechanisms and in particular to speed changing devices adapted to be incorporated in power transmitting mechanisms and operable responsive to predetermined conditions of operation of the vehicle in which such mechanism has been incorporated for automatically effecting changes in the gear or driving ratio between the engine and the road wheels of the vehicle.

For purposes of illustration, we have disclosed our novel speed changing device as incorporated in a power transmitting mechanism, conventional in other respects, and of the type commonly used in automotive vehicles at the present time. The invention contemplates the provision in a transmission of a speed changing device normally operable for automatically effecting changes in the gear or driving ratio responsive to factors or conditions of operation of a vehicle in which the transmission has been incorporated, but which may be manually operable by the operator of the vehicle when such is desirable, such as to permit the operator to exercise direct control over the movement of the vehicle under abnormal or unusual driving conditions.

Under conditions normally encountered in operating an automotive vehicle of the type now commonly in use, two forward gear or driving ratios will provide the necessary range of power and speed for starting and operating the vehicle, and for that purpose, a single position of the shift lever controlling the transmission will be sufficient when the transmission embodies an automatic speed changing device of the type illustrated. Thus, a single manipulation of the shift lever will be sufficient when it is desired to drive the vehicle forwardly, and nothing more than the operation of the engine throttle is necessary for accelerating, decelerating and changing the driving ratio from a reduced gear ratio to a direct drive.

The operation of an automotive vehicle embodying such devices is simplified, but such devices have the effect of minimizing the amount of direct control which an operator may exercise over movement of the vehicle. Abnormal or unusual driving conditions are sometimes suddenly encountered during the operation of an automotive vehicle which are beyond the range of flexibility provided by an automatic speed changing device—that is, commercially practicable automatic speed changing devices in common with all other automatic devices have inherent limitations to their adaptability, which limitations are determined by the various factors to which such devices are responsive.

For the purpose of enabling the operator of a vehicle, in which a transmission embodying an automatic speed changing device has been incorporated, to cope with unusual driving conditions as far as such is possible by control of the transmission, such as by changing of the gear or driving ratio, we have provided, as an adjunct to the automatic speed changing device, means whereby the operator of the vehicle may optionally select any one of a plurality of driving connections without regard to the particular condition of operation of the vehicle.

An object of the invention, therefore, is to provide a power transmitting mechanism embodying a speed changing device, normally operable for automatically varying the speed ratio of the driving connection between the engine of a vehicle and the road wheels thereof, responsive to predetermined conditions of operation of the vehicle, with manipulative means for varying the speed ratio of the driving connection without regard to the particular condition of operation of the vehicle.

Another object of the invention is to provide, in a power transmitting mechanism, embodying an automatic speed changing device, manipulative control means for rendering the automatic speed changing device inoperative whenever such is desired.

Another object of the invention is to provide, in a power transmitting mechanism embodying an automatic speed changing device, means for changing the speed ratio of the driving connection between the engine and the road wheels of the vehicle in which the transmission is incorporated, without regard to the particular condition of operation of the vehicle at the time such a change is made.

Other objects and advantages will be apparent from the following description with reference to the accompanying drawings of which there are three sheets and in which:

Fig. 1 is a diagrammatic view of a portion of an automotive vehicle and illustrates the application of a transmission embodying our automatic speed changing device thereto;

Fig. 2 is a longitudinal view, partly in section, of a power transmitting mechanism in which we have chosen to illustrate our speed changing device;

Fig. 3 is a top plan view taken generally on the line 3—3 of Fig. 2 and illustrating the controls for the speed changing device;

Fig. 4 is a side elevational view taken on the line 4—4 of Fig. 3 and illustrating the auxiliary controls and their connections with the speed changing device;

Fig. 5 is a detail cross sectional view taken on the line 5—5 of Fig. 4 and further illustrating the auxiliary control connections;

Fig. 6 is a vertical cross sectional view taken on the line 6—6 of Fig. 2, looking in the direction of the arrows, and illustrating the details of the automatic speed changing device;

Fig. 7 is a vertical cross sectional view taken on the line 7—7 of Fig. 2, looking in the direction of the arrows, and illustrating other details of the automatic speed changing device;

Fig. 8 is a vertical cross sectional view taken on the line 8—8 of Fig. 2, looking in the direction of the arrows, and illustrating the constructional details of the overrunning clutch; and Fig. 9 is a diagrammatic view of the handle positions of the gear shift lever.

Referring now particularly to Fig. 1 of the drawing, there is shown diagrammatically a portion of an automotive vehicle having a main frame 10 providing a support for an engine 12, a housing-enclosed clutch 14, a transmission indicated generally at 16, and a driven or propeller shaft 18, suitably connected to the road wheels of the vehicle.

The transmission, or power transmitting mechanism, indicated generally at 16, comprises a casing 20 providing a housing for the operating parts of the transmission and a support for a cover plate 22. A driving shaft 24 adapted to be connected to the engine through the housing-enclosed clutch 14 is journaled in a bearing 26 suitably secured in an aperture in the forward wall of the casing 20. The driven shaft 18 at its forward end is journaled in a roller bearing 28 disposed within a counterbore provided in the posterior end of the driving shaft 24, and a bearing 30 suitably secured in an aperture in the rearward wall of the transmission casing provides a bearing support for the rearward end of the driven shaft 18.

A countershaft 32 supported by the forward and rearward walls of the transmission casing is secured against rotation and provides a support for a cluster of gears 34 rotatably mounted thereon and comprising helical gears 36 and 38 and gears 40 and 42. The driven shaft 18 has slidably splined thereon a gear 44 which is adapted to mesh with gear 40 of the cluster of gears, and with an idler gear 46 suitably mounted within the casing 20 and constantly in mesh with the gear 42 of the cluster of gears. A posterior end portion of the driving shaft 24 within the casing 20 may be formed to provide a helical gear 48 which is adapted constantly to mesh with helical gear 36 of the cluster of gears for the purpose of driving the same with the driving shaft 24.

An intermediate speed helical gear 50 rotatably mounted on the driven shaft 18 and secured against lateral displacement thereon by thrust washers 52, is constantly in mesh with helical gear 38 of the cluster of gears and is provided with external sets of teeth 54 and 56 on each side thereof. An overrunning clutch unit, indicated generally at 58, is slidably splined to the driven shaft 18 and disposed between the helical gear 50 and the slidable gear 44.

Reference may now be had to Fig. 8, where the details of construction of the overrunning clutch unit are better illustrated. The clutch unit 58 comprises a driving clutch member 60, a driven clutch member 62, and a plurality of spring pressed rollers 64, each of which is disposed in one of a plurality of eccentric raceways 66, circumferentially disposed about the external face of the driven clutch member 62. Washers 68 and snap rings 70 are provided for confining the rollers within the raceways and the driven member 62 within the shell of the driving member 60. The spring pressed rollers 64 are adapted to be forced into the narrower end of the raceways 66 whenever the driving member 60 tends to overrun the driven member in the direction of the arrow indicated in Fig. 8, for the purpose of locking the driving and driven members for rotation together as a unit.

The spring pressed rollers 64 are adapted, however, to permit the driven member 62 to overrun the driving member 60 in the direction of the arrow indicated in Fig. 8. The driving member 60 of the clutch unit 58 is provided with an internal set of teeth 72 which are adapted to mesh with teeth 56 provided on the intermediate speed helical gear 50 for the purpose of providing a one-way or free wheeling intermediate speed drive between the driving and the driven shafts and through the intermediary of helical gears 48, 36, 38, 50 and clutch unit 58, the driven member 62 of which is splined to the driven shaft 18. The clutch unit 58 comprises a portion of the automatic speed changing device which also includes a clutch unit 74 comprising a driving member 76, which may be formed on the posterior end of the driving shaft, and a driven member 78, which is splined to the forward end of the driven shaft 18.

Driven member 78 comprises an annular plate or core provided with a pair of laterally extending arms 80 disposed on the opposite side of the driven shaft 18. The arms 80 may be formed by milling a slot through a cylindrical projection of the annular plate 78 and are externally provided with teeth 82. A collar 84 provided with an enlarged internal annular groove 86 is provided with internal sets of teeth 88 and 90 which are adapted to slide upon the external teeth 82 provided on the arms 80 of the driven member 78 of the clutch unit 74. The collar 84 is adapted to be shifted to the right, looking at Fig. 2, for the purpose of meshing teeth 90 thereon with external teeth 54 provided on the intermediate speed helical gear 50 for the purpose of providing a positive intermediate speed drive between the driving and the driven shafts and through the intermediary of helical gears 48, 36, 38, 50, collar 84 and driven member 78 of the clutch unit 74, which is splined to the driven shaft 18.

The core portion of the driven member 78 is provided with a diametrical slot or groove 92 coinciding with the opening between the arms 80. In each portion of the groove 92 on the opposite side of the driven shaft 18 there is slidably mounted the bolts 94, each of which is provided with a longitudinally extending bore 96. The bolts 94 are radially movable in the slots 92 and are restrained against such movement by a spring 98, the opposite ends of which are hooked on to a pin 100 carried by each of the bolts 94. The driven shaft 18 is provided with the bore 103 coincidental with the bores 96 in the bolts 94 for accommodating the spring 98.

The pins 100 project into slots 104 provided in the core or driven member 78 for limiting the outward movement of the bolts 94. Each of the bolts 94 is provided with a laterally extending arm 106 disposed within the slots 108 provided between the arms 80. Each of the arms 106 is provided with a head 110 having a beveled face 112 which is adapted to cooperate with a beveled face 114 provided internally on the collar 84 adjacent the internal groove 86. When the automatic speed changing device is in its inoperative position, either the teeth 88 or 90, internally provided on the collar 84, are adapted to overlie the head 110 of the arms 106 carried by the bolts 94, for the purpose of holding the bolts 94 in their inward or retracted position.

The driving member 76 of the clutch unit 74 is provided with a plurality of circumferentially disposed slots 116 which are slightly greater in length, preferably several thousandths of an inch, than the width of the bolts 94 and are adapted in pairs to line up with the slots or grooves 92 so that the bolts 94 may project into the slots 116.

The bolts 94 are adapted to be moved radially outwardly responsive to centrifugal force resulting from rotation of the driven member 78. It will be apparent, however, that the bolts can move outwardly only whenever the slots 92 coincide with the slots 116 provided in the driving member 76. The driven member 78 is provided with a plurality of adjustable spring pressed poppets 120, 122, 124 and 126, a pair of which are adapted to cooperate with each bolt 94. The bolts 94 are provided with a notch 130 on one side thereof and a notch 132 on the other side thereof. The poppets 122 and 124 are adapted to be in engagement with the notches 130 when the bolts 94 are in their retracted position.

The spring pressed adjustable poppets 120 and 126 are adapted to engage the notches 132 when the bolts are in their projected position. Due to the tension of the spring 98, the bolts are normally movable outwardly when the speed of rotation of the driven member 78 attains a predetermined rate, which rate is sufficient to generate enough centrifugal force to move the bolt 94 outwardly against the tension of the spring 98. The spring pressed poppets 122 and 124 engaging in the notches 130 in the sides of the bolts 94 have the effect of increasing the starting inertia of the bolts 94 and raise the speed of rotation necessary to move the bolts outwardly. The poppets 122 and 124 may be adjusted for increasing the speed of rotation at which the bolts 94 will move outwardly.

The spring pressed adjustable poppets 120 and 126, which are adapted to engage in the notches 132 when the bolts are in their projected position, tend to hold the bolts in such position until the speed of rotation of the driven member 78 has fallen below that necessary to hold the bolts in their outward position. Due to the shifting of the center of gravity of the bolts 94 away from the axis of rotation, it will be apparent that a lower speed of rotation of the driven member 78 will be sufficient to hold the bolts in their outward position than that which is necessary to move the bolts outwardly. For this reason, a differential between the speed at which the bolts tend to move outwardly and the speed at which the bolts will move inwardly exists. The spring pressed poppets 120 and 126 have the effect of resisting inward movement of the bolts 94 and may be adjusted further to increase the differential by reducing the speed at which the bolts will move inwardly. The tension of the spring 98 must be sufficient to overcome the force of the spring pressed poppets 122 and 126 and the centrifugal force resulting from rotation of the driven member 78 before the bolts will move to their inward position.

Each of the bolts 94 is provided with an eccentric face 140, which faces are adapted to cause the bolts to "jump" the slots 116 in the driving member when the driving member is rotating at a rate of speed substantially in excess to that of the driven member. For that reason, before the bolts 94 may be moved outwardly, even though the speed of rotation of the driven member 78 is sufficient to overcome the tension of the spring 98, the slots 116 must line up with the slots 92 for a period sufficiently long to enable the bolts 94 to drop into the slots 116. The eccentric face 140 has the effect of camming the bolts 94 out of the slots 116 unless the speed of rotation of the two members is substantially the same, at which time the bolts will, under the action of centrifugal force, be moved into the slots 116 for the purpose of locking the driving and the driven member of the clutch unit 74 together. The bolts will then remain in their outward position until the speed of rotation of the driven member falls below that necessary to hold the bolts outwardly, at which time the bolts will move inwardly, provided there is no torque between the driving member 76 and the bolts 94.

For the purpose of shifting the automatic speed changing device into operative position and for effecting various gear or driving ratios between the engine of the vehicle and the road wheels thereof, there are provided manually controlled means for moving the shiftable parts of the transmission mechanism.

Referring now to Figs. 3 to 5 particularly, the cover plate 22 of the transmission casing provides a support for a plurality of yoke rods 150, 152 and 154, which provide a means for selectively shifting the movable parts of the transmission. A shift lever 156 mounted upon a housing 158 carried by the cover plate 22 is provided for shifting the yoke rods 150, 152 and 154. The yoke rod 150 is provided with a plurality of notches 158, 160 and 162 on the upper side thereof corresponding respectively with the low, neutral and reverse positions of such yoke rod, and which are adapted to be engaged by a spring pressed poppet 164 provided in the cover plate 22. The yoke rod 150 has fixedly secured thereto a shift fork 166 which is connected to the gear 44 and adapted to move the same for providing either a low speed drive or a reverse drive between the driving and the driven shafts. Movement of the yoke rod 150 to a position where the notch 158 engages the spring pressed poppet 164, will provide a reverse drive between the shafts, and movement of the yoke rod 150 to a position where the notch 162 engages the spring pressed poppet 164 will provide a positive low speed drive between the shafts. The yoke rod 150 is provided with a notch or recess 168 which is adapted to receive the lower end of the shift lever 156 so that the yoke rod may be moved thereby.

Yoke rod 152 is provided with a gate 170 which is adapted to receive the lower end of the shift fork 156 for the purpose of moving the yoke rod 152, and with a plurality of notches 172 and 174 on the upper side thereof, which notches are adapted to be engaged by a spring pressed poppet such as 164 and which correspond respectively with the neutral and automatic positions of the yoke rod 152. Yoke rod 152 has fixedly secured thereto a shift fork 176 which is provided for moving the clutch unit 58 to the left, looking at Fig. 2, for the purpose of meshing the teeth 72 thereof with the teeth 56 provided on the intermediate speed helical gear 50, for the purpose of providing an intermediate speed free wheeling drive between the driving and the driven shafts.

An intermediate portion of the yoke rod 152 is recessed at 178 to provide clearance for a rocker arm 180 carried by a collar 182, slidably secured on the yoke rod 154. The extent of relative movement of the collar 182 on the yoke rod 154 is limited by a bolt 184, the end of which engages a flatted portion 186 provided on the side of the yoke rod 154. The yoke rod 154 is biased to the left by a spring 188 and is provided with a plurality of notched portions 190 and 192 on the side thereof adjacent the yoke rod 152, which are adapted to receive the heads 194 and 196, respectively, of the rocker arm 180. A shaft 200 is journaled in a side of the transmission casing 20 and carries on the inside of the transmission a lever 202, the free end of which is adapted to engage a notch 204 provided in the forward end of the yoke rod 154. The outer end of the shaft 200 carries a lever arm 206 and to which is connected a Bowden wire control 208 leading to a dash control 210.

As shown in Fig. 3, the controls are in neutral position. Movement of the handle of the gear shift lever 156 to the automatic position, as indicated in Fig. 9, is adapted to move the yoke rod 152 to the left, looking at Fig. 3, through the engagement of the lower end of the shift lever 156 with the gate 170 provided on the forward end of the yoke rod 152 for the purpose of moving or shifting clutch unit 58 into engagement with the external teeth 56 provided on the intermediate speed helical gear 50.

The head 196 of the rocker arm 180 is in engagement with a tapered shoulder provided by the cutaway portion 178 and will cause the collar 182 on the yoke rod 154 to be shifted to the left, looking at Fig. 3, when the yoke rod 152 is moved to the left. The collar 182 carries a shift fork 183, which is provided for shifting the collar 84, slidably mounted upon the arms 80 of the driven member 78 of the clutch unit 74. The collar 182 and shift fork 183 will be moved to the left along with the initial movement of the yoke rod 152 to a position where the end of the bolt 184 will engage the shoulder provided at the opposite end of the flatted portion 186 on the yoke rod 154, and the head 196 will drop into the notch 192 provided in the yoke rod 154, as the head 194 will ride up out of the notch 190 on to the side of the rail.

Collar 84 will be shifted to a position where the head 110 of the arms 106 will underlie the internal annular groove 86 provided in the collar 84, so that the bolts 94 may move outwardly responsive to centrifugal force resulting from rotation of the driven member 78 of the clutch unit 74. The drive, initially, will be through the helical gears 48, 36, 38, 50 and clutch unit 58. When the speed of rotation of the driven shaft and the driven clutch member 78 is sufficient to move the bolts 94 outwardly for the purpose of interlocking the driving and driven members 76 and 78 of the clutch unit 74, the drive will be directly through the clutch unit 74 whose driven member 78 is splined to the driven shaft.

The bolts 94 will, however, remain in their inner position until the speed of rotation of the driving and driven members 76 and 78 is substantially the same. This may be accomplished by temporarily closing the engine throttle to reduce the speed of the engine. When the speed of the driving member 76 approximates that of the driven member, the bolts 94 will be projected outwardly for the purpose of locking the two members for rotation together. A subsequent deceleration of the speed of rotation of the driven shaft 18 below that sufficient to hold the bolts 94 outwardly, will, when the torque between the bolts 94 and the driving member 76 is released, permit the bolts 94 to be moved inwardly for the purpose of breaking the driving connection of the clutch 74.

When the bolts are in their outward position, the clutch unit 58 will remain in engagement with the intermediate speed helical gear 50, but the driven shaft 18 and the driven clutch member 62 will overrun the driving clutch member 60. When the bolts 94 return to their retracted position, subsequent to a deceleration of the speed of the vehicle, the clutch unit 58 will again become operative for driving the driven shaft at a reduced rate of speed. These two gear or driving ratios normally will provide a sufficient range of speed and power for operating a motor vehicle. Spring 193, secured at one end to the yoke rod 154 and at the other end to the sleeve 182, is provided for returning the sleeve 84 to neutral position when the shift lever 156 is restored to neutral position, by moving the same so that notch 172 engages poppet 164. However, under some conditions of operation, it is desirable to change from a high speed drive to an intermediate speed drive, even though the speed of rotation of the driven shaft is above that at which the bolts normally return to their retracted position.

For the purpose of providing locked-up intermediate and high speed direct drives and a locked-up free wheeling intermediate speed drive, in which positions the automatic speed changing device will be inoperative, we have provided a dash control 210 which may be operated by the driver of the vehicle for the purpose of changing the driving or gear ratio at any time desired. Thus, by pulling the dash control 210 outwardly to its first position, the yoke rod 154 will be shifted to the right from the position into which it was moved when the transmission was placed in automatic gear, for the purpose of shifting the collar 84 back to the position in which it is shown in Fig. 2 of the drawings.

This may be accomplished without shifting the clutch unit 58 out of engagement with the intermediate speed helical gear 50, for when the yoke rod 152 was moved into automatic position, the head 196 provided on the rocker arm 180 was moved into a position where it dropped into the notch 192 provided on the yoke rod 154, so that the head 196 will clear the side of the yoke rod 152 adjacent the yoke rod 154. This will permit the yoke rod 154 to be moved to the right without moving the yoke rod 152. When the yoke rod 152 is moved to the right by movement of the dash control to the first position, the collar will be in the same relative position in which it is shown, but the head 196 of the rocker arm will be in engagement with the notch 192 of the yoke rod, and the end of the bolt 184 will be at the opposite end of the flatted portion 186.

The dash control 210 may be pulled out to a second position for the purpose of shifting the yoke rod 154 further to the right and the collar 182 with it. This will move the collar 84 to a position where the teeth 90 thereof will engage the teeth 54 externally provided on the intermediate speed helical gear 50 to provide a locked-up intermediate speed positive drive between the driving and the driven shafts.

The collar 84 is provided with an external set of teeth 220 which are adapted to mesh with a lateral set of jaw teeth 222 provided on the end of the driving member 76 of the clutch unit 74. The collar 84 may be shifted to the left, looking at Fig. 2, from the automatic position in which it is placed, by manipulation of the shift lever 156, to a position where the teeth 220 will mesh with the teeth 222 for providing a locked-up positive high speed drive between the driving and the driven shafts. In this position the heads 110 will hold the bolts 106 in their inward position by engagement with the teeth 90 internally provided on the collar 84. When the collar 84 is in position to mesh the teeth 220 with the teeth 222, the drive will remain in positive high until the collar 84 is shifted back to the position where the internal annular groove 86 thereof overlies the heads 110 of the arms 106 carrying the bolts 94.

Whenever the shift lever 156 is in automatic position and the bolts 94 are in their projected position, it will be possible to effect a change to a free wheeling or a positive intermediate speed drive at any time by manipulation of the dash control 210. Assuming that the collar 84 is in a position where the bolts may fly outwardly, the heads 110 of the arms 106 will be within the grooves 86 provided internally on the collar 84. Movement of the collar 84 to the right, looking at Fig. 2, will cause the beveled edge 114 thereon to cam the heads 110, through engagement with the beveled edge 112, out of the groove and carrying with them the bolts 94 out of the slots 116.

A suitable locking means may be provided for holding the dash control in set position, in order to retain the transmission in a forced free wheeling second drive as long as such drive is desired, because the spring 188 tends to move the yoke rod 154 to the left, and would for that reason slide the collar 84 to the left to permit the bolts to move radially outwardly.

A high speed drive may be effected without first going into an automatic drive, by manipulation of the dash control 210 to shift the yoke rod 154 to the left. If the transmission is set for automatic drive, a positive locked-up high speed drive may be effected only if the bolts 94 are in their retracted position. A change in the driving ratio from a positive locked-up high speed drive to either a locked-up intermediate free wheeling drive or a locked-up positive intermediate drive may be effected at any time and without regard to the speed of the road wheels of the vehicle by pulling out the dash control to corresponding position. When the collar 84 is shifted to the right, looking at Fig. 2, it may be shifted at any time providing there is no torque between the teeth 220 and 222 for the purpose of effecting either a locked-up free wheeling or positive intermediate speed drive, even though the speed of rotation of the driven member 78 of the clutch is sufficient to move the bolts 94 outwardly.

If it is desired to effect a locked-up free wheeling or positive intermediate speed drive upon starting of the vehicle in the forward direction, it may be accomplished by moving the dash control to such position subsequent to moving the handle of the gear shift lever to automatic position indicated in Fig. 9. This manipulation of the shift lever 156 is necessary in order to free the head 196 of the rocker arm 180 from engagement with the shoulder provided by the cutaway portion 178 of the yoke rod 152, so that the yoke rod 154 may be moved independently of the yoke rod 152.

While several specific embodiments of our invention have been illustrated and described, it must be appreciated that many modifications may be made in the construction thereof without departing from the scope of the invention, and for that reason we do not desire to be limited to any particular form or arrangement except in so far as such limitations are included in the following claims.

1. A speed changing device for a variable speed power transmitting mechanism having driving and driven shafts, gearing including an overrunning clutch, and operable for providing a plurality of driving connections between said shafts, means operatively associated with said shafts and responsive to speed control of said shafts for automatically effecting changes in the ratio of the driving connection between said shafts, controlled means for rendering said speed control responsive means operative and inoperative and selectively cooperable with said gearing to effect optional changes in the ratio of the driving connection between said shafts, manipulative means for normally operating said controlled means to render said speed control responsive means operative and inoperative, auxiliary means for operating said controlled means to effect optional changes in the ratio of the driving connection between said shafts, and a lost motion connection between said manipulative means and said auxiliary means whereby either of said means may be operated without disturbing the other of said means.

2. Transmission mechanism including driving and driven shafts with means affording an initial driving connection between said shafts, an automatic clutch having a member associated with each of said shafts and operable responsive to predetermined conditions of operation thereof for interconnecting said shafts, a shiftable clutch member connected to one of said automatic clutch members and shiftable in one direction for rendering said automatic clutch inoperable, a clutch element driven from said driving shaft at a relatively different rate than that of said automatic clutch members, said shiftable clutch member being further shiftable in the same direction to operatively engage said clutch element for connecting said driven shaft thereto to be driven thereby.

3. In a speed changing device for a variable speed power transmitting mechanism having driving and driven shafts, gearing driven from said driving shaft and including a plurality of clutch elements driven at relatively different rates, said clutch elements constituting a portion of a manually engageable and disengageable clutch mechanism, said clutch mechanism being operable for selectively connecting said driven shaft to said driving shaft in a plurality of different ratios, and including a member operatively associated with said driven shaft, and a shiftable clutch sleeve connected to said member and selectively engageable with each of said clutch elements, said member and one of said clutch elements being provided with automatically engageable clutch means operable responsive to predetermined conditions of operation of said shafts for connecting said shafts, said shiftable sleeve being cooperable with said clutch means for rendering the same inoperative.

4. A speed changing device for a variable speed power transmitting mechanism for connecting the engine of a motor vehicle to the road wheels thereof in a plurality of driving ratios and having a driving shaft operatively connected to the engine and a driven shaft operatively connected to the road wheels of the vehicle, comprising gearing providing an initial driving connection between said shafts, an automatic clutch mechanism operable for providing a driving connection between said shafts of a ratio different than that provided by said gearing, said clutch mechanism including a member operatively associated with each of said shafts, and a control member carried by one of said other clutch members and cooperable therewith for rendering said automatic clutch mechanism inoperable, said control member being engageable with the other of said clutch members for providing a locked-up driving connection between said shafts, manipulative means for operating said control member to render said automatic clutch mechanism inoperable, auxiliary means for operating said control member to provide a locked-up driving connection between said shafts, and a lost motion connection between said manipulative means and said auxiliary means whereby one of said means may be operated without operating the other of said means.

5. A speed changing device for a variable speed power transmitting mechanism having driving and driven shafts adapted to be connected in a plurality of drives, gearing providing an initial driving connection between said shafts, automatic clutch mechanism operable for providing a driving connection between said shafts of a ratio different than that provided by said gearing, said automatic clutch including a member operatively associated with each of said shafts, and a control member carried by one of said clutch members and cooperable therewith for rendering said automatic clutch mechanism inoperable, a yoke rod, a shift fork carried thereby and adapted to operate said control member, and independently operable means for moving said yoke rod, one of said last named means being disconnectable from said yoke rod when the same is moved by the other of said means.

6. A speed changing device for a variable speed power transmitting mechanism having aligned driving and driven shafts adapted to be connected in a plurality of drives comprising in combination, a clutch element mounted on the driving shaft, a clutch element rotatably mounted on the driven shaft and driven through a train of speed reduction gearing from said driving shaft, an overrunning clutch connecting said clutch element on the driven shaft thereto, a clutch member mounted on said driven shaft between said clutch elements and having means operable responsive to variations of the speed of rotation of the driven shaft above and below predetermined rates for automatically engaging with and disengaging from said clutch element on the driving shaft, a clutch ring carried by said clutch member operable for rendering said means operative and inoperative without regard to the speed of rotation of said driven shaft and adapted selectively to engage either of said clutch elements to effect a direct or a reduced drive between said shafts and manipulative means for operating said clutch ring.

7. A speed changing device for a variable speed power transmitting mechanism having aligned driving and driven shafts and adapted to provide a plurality of drives between the engine of a motor vehicle and the road wheels thereof comprising a clutch element mounted on the driving shaft, a clutch element rotatably mounted on the driven shaft and connected to the driving shaft through a train of speed reduction gearing, an overrunning clutch connecting said clutch element on the driven shaft thereto, a clutch member mounted on said driven shaft and having means operable responsive to variations of the speed of rotation of the driven shaft above and below predetermined rates for automatically engaging with and disengaging from said clutch element on the driving shaft, a clutch ring carried by said clutch member operable for rendering said means operative and inoperative and adapted selectively to engage either of said clutch elements to effect a direct or a reduced drive between said shafts, manipulative means controlling said clutch ring for rendering said means operative and inoperative without regard to the speed of rotation of said driven shaft, auxiliary means controlling said clutch ring for selectively effecting direct and reduced drives between said shafts and a lost motion connection between said manipulative means and said auxiliary means whereby one of said means may be operated without affecting the set position of the other of said means.

8. A speed changing device for a variable speed power transmitting mechanism comprising two clutch elements rotating at different rates of speed and driven from a common source, a shaft connected to be driven by the slower rotating of said clutch elements and adapted to be connected directly to the faster rotating of said clutch elements to be driven thereby, a clutch member mounted on said shaft and provided with means operable responsive to variations of the speed of rotation of said shaft above and below critical rates for connecting and disconnecting said clutch member and the faster rotating of said clutch elements, a clutch ring carried by said clutch member and operable for rendering said means operative and inoperative without regard to the speed of rotation of said shaft, said clutch ring being selectively engageable with either of said clutch elements for connecting said shaft thereto, and manipulative means for shifting said clutch ring.

9. A speed changing device for a variable speed power transmitting mechanism comprising two clutch elements rotating at different rates of speed and driven from a common source, a shaft connected to be driven by the slower rotating of said clutch elements and adapted to be connected directly to the faster rotating of said clutch elements to be driven thereby, a clutch member mounted on said shaft and provided with radially movable bolts operable responsive to centrifugal force resulting from rotation of said clutch member at a predetermined rate for positively engaging the faster rotating of said clutch elements, each of said bolts being provided with a laterally projecting arm having a cam surface, means opposing centrifugal force and operable for moving said bolts to an inoperative position when the speed of rotation of said clutch member attains a predetermined rate, a clutch ring slidably carried by said clutch member and having a cam surface adapted to cooperate with the cam surface provided on said arms for rendering said bolts inoperative, said clutch ring being adapted selectively to engage either of said clutch elements for connecting said shaft thereto to be driven thereby.

10. In a device of the class described, the combination of two clutch elements rotating at different rates of speed and connected to a common source, with a shaft, an overrunning clutch providing a one-way drive between the slower rotating of said clutch elements and said shaft, clutch means mounted on said shaft and disposed between said clutch elements comprising a radially movable bolt carried by said clutch means and operable responsive to centrifugal force resulting from rotation thereof above a predetermined rate for positively engaging the faster rotating of said clutch elements, resilient means opposing the movement of said bolt responsive to centrifugal force, a laterally extending arm on said bolt and provided with a head having a beveled edge surface, a sleeve slidably carried by said clutch means and having an internal annular groove adapted to receive said head when said bolt is in engagement with the faster rotating of said clutch elements and provided with a cam surface cooperable with said beveled edge surface on said arm for rendering said bolt inoperative to engage the faster rotating of said clutch elements, said sleeve being shiftable into engagement with either of said clutch elements when said bolt is inoperative for selectively connecting said shaft to either of said clutch elements, and manually operated means for shifting said sleeve.

11. A speed changing device for a variable speed power transmitting mechanism comprising two clutch elements rotating at different rates of speed and connected to be driven from a common source, in combination with a shaft adapted to be connected to said clutch elements to be driven thereby, an overrunning clutch providing a one-way drive between the slower rotating of said clutch elements and said shaft, a clutch member mounted on said shaft and having a radially movable bolt carried by said clutch member and operable responsive to centrifugal force resulting from rotation thereof above a predetermined rate for positively engaging the faster rotating of said clutch elements, resilient means opposing the movement of said bolt responsive to centrifugal force, a laterally extending arm on said bolt and provided with a beveled edge surface, a sleeve slidably mounted on said clutch member and having an internal annular groove adapted to receive said head when said bolt is in engagement with the faster rotating of said clutch elements, and provided with a cam surface cooperable with said beveled edge surface for rendering said bolt inoperative to engage the faster rotating of said clutch elements, said sleeve being shiftable into engagement with either of said clutch elements when said bolt is inoperative for selectively connecting said shaft to either of said clutch elements, manually operated means for shifting said sleeve to render said bolt inoperative, auxiliary means operable for selectively shifting said sleeve into engagement with either of said clutch elements, and a lost motion connection between said last named means whereby one may be operated without affecting the other.

12. In a variable speed power transmitting mechanism, the combination of a driving shaft having a clutch element thereon, a driven shaft, a clutch element rotatably mounted thereon and connected through a train of speed reduction gearing to the driving shaft to be driven thereby, an overrunning clutch slidably splined to said driven shaft and adapted to connect the same to said driven shaft clutch element, a clutch member mounted on said driven shaft and having means operable responsive to centrifugal force resulting from rotation of said member above a predetermined rate for positively connecting the same to said driving shaft clutch element, a sleeve slidably mounted on said clutch member and adapted to control the operative condition of said means, means for shifting said overrunning clutch into engagement with said driven shaft clutch element and simultaneously therewith shifting said sleeve to render said centrifugal force responsive means operable so that when the speed of rotation of said driven shaft attains a predetermined rate said means will be operative to connect said driven shaft to said driving shaft clutch element, and auxiliary means for shifting said sleeve without shifting said overrunning clutch for rendering said means inoperative to connect said driven shaft to said driving shaft clutch element.

13. In a variable speed power transmitting mechanism, the combination of a driving shaft having a clutch element thereon, a driven shaft, a clutch element rotatably mounted thereon and connected through a train of speed reduction gearing to the driving shaft to be driven thereby, an overrunning clutch slidably splined to said driven shaft and adapted to connect the same to said driven shaft clutch element, a clutch member mounted on said driven shaft and having means operable responsive to centrifugal force resulting from rotation of said member above a predetermined rate for positively connecting the same to said driving shaft clutch element, a clutch sleeve slidably mounted on said clutch member and adapted to control the operative condition of said means, means for shifting said overrunning clutch into engagement with said driven shaft clutch element and simultaneously therewith shifting said sleeve to render said centrifugal force responsive means operable so that when the speed of rotation of said driven shaft attains a predetermined rate said means will be operative to connect said driven shaft to said driving shaft clutch element, said clutch sleeve being adapted positively to engage either of said clutch elements for driving said driven shaft thereby, auxiliary means for shifting said sleeve without shifting said overrunning clutch selectively to engage the same with either of said clutch elements, and a lost motion connection between said shifting means and said auxiliary means whereby one may be operated without affecting the set position of the other.

14. Variable speed power transmitting mechanism having in combination driving and driven shafts, gearing providing an initial driving connection between said shafts and including a plurality of clutch members driven at relatively different rates, one of said clutch members constituting a part of a clutch unit which is adapted automatically to provide changes in the ratio of the drive between said shafts, said clutch unit including a part operatively associated with said driven shaft and a shiftable clutch member mounted on one of said parts and adapted to control the operative condition of said clutch unit, said shiftable member being selectively operable to engage either of said clutch members for connecting said driven shaft thereto, and manually operated means for shifting said shiftable member.

15. In a variable speed power transmitting mechanism having driving and driven shafts and a neutral setting in which no driving connection is provided between said shafts, a plurality of driving clutch elements driven from said driving shaft and rotating at relatively different rates, a corresponding clutching device for each of said clutch elements and operatively associated with said driven shaft, said clutching devices being progressively cooperable with the respective clutch elements for establishing different ratio driving connections between said shafts, each of said clutching devices being in an inoperative condition when said mechanism is in neutral, means for simultaneously putting said clutching devices in an operative condition where the same may be operable to provide a driving connection between said shafts, and means for putting one of said clutching devices in inoperative condition independent of another of said clutching devices.

16. Variable speed power transmitting mechanism having driving and driven shafts, means including an overrunning clutch operable to afford a one-way driving connection between said shafts, an automatic clutch having a member operatively associated with each of said shafts and speed responsive means carried by one of said members and operable to connect said members to provide a driving connection between said shafts of a ratio different than said one-way driving connection, and subsequent to the establishment of said one-way driving connection, shiftable means controlling the operability of said speed responsive means and normally positioned for holding the same inoperative whenever the power transmitting mechanism is not set to provide a driving connection between said shafts, manipulative means for simultaneously setting said power transmitting mechanism to establish said one-way driving connection and positioning said shiftable means to release said speed responsive means, said shiftable means and one of the said members of said automatic clutch being provided with interengageable clutch teeth, and means for independently coupling said clutch teeth without establishing said one-way driving connection between said shafts.

17. A speed changing device for a variable speed power transmitting mechanism having driving and driven shafts and comprising a plurality of driving clutch elements driven from said driving shaft at relatively different rates, shiftable means operable for connecting one of said driving elements to said shafts to provide an initial driving connection between said shafts, the other of said elements constituting a portion of an automatic clutch, said automatic clutch being operable responsive to speed control of said shafts and including a member connected to said driven shaft, controlled means operatively associated with said driven member and operable for rendering said automatic clutch inoperable, said controlled means being engageable with one of said driving clutch elements to connect said driven shaft thereto to be driven thereby, manipulative means for normally operating said controlled means to render said automatic clutch inoperable, auxiliary means for operating said controlled means to couple said controlled means and said driving clutch element, and a lost motion connection between said manipulative means and said auxiliary means to permit one of said means to be operated independently of the other of said means.

CARL F. RAUEN.
ANO E. KILPELA.